Patented Dec. 10, 1929

1,739,448

UNITED STATES PATENT OFFICE

ANDRÉ HENRI VICTOR DURR, OF PARIS, FRANCE, ASSIGNOR TO COMPAGNIE NATIONALE DE MATIERES COLORANTES ET MANUFACTURES DE PRODUITS CHIMIQUES DU NORD REUNIES, ETABLISSEMENTS KUHLMANN, OF PARIS, FRANCE, A CORPORATION OF FRANCE

RESINOUS CONDENSATION PRODUCT

No Drawing. Application filed January 2, 1929, Serial No. 329,941, and in France December 31, 1927.

The present invention relates to esters and new derivatives and their resinous condensation products obtained by combination of an aliphatic polyhydric alcohol with a mixture of a polybasic acid and one or several natural resins (by the action of their resinic acids) and polymerization of the products formed.

Analogous products of condensation have now been obtained, starting from the known products, the saturated combination or glycerine and phthalic acid or anhydride or equivalents, and the combination of natural resins and glycerine, known as resinic esters. These new products are obtained by condensation on either the glyceryl phthalate or the resinic ester, either preformed or in process of formation of either case, of the other product or ingredients thereof. That is to say, that glyceryl phthalate and a resinic ester are condensed together, or, what is equivalent, the ingredients of glyceryl phthalate may be added to resinic ester, preformed or otherwise, or the ingredients of resinic ester may be added to glyceryl phthalate, preformed or otherwise.

In this specification, the terms "polybasic acid" and "natural resins" are to be construed in their widest sense and are specifically intended to include polybasic anhydrides in the one case and and natural gums in the other.

Products analogous to those described above have been obtained as follows:

1. By condensing together a resinic ester and a glyceryl phthalate, and heating progressively a mixture of these two products, the following phenomena are observed: Up to 200°, there is a simple mixture and the product, treated by an ester, such as ethyl acetate, dissolves the resinic ester and leaves the insoluble glyceryl phthalate.

From 200° upwards, a gaseous emission with the formation of froth is observed, which is the sign of a combination and the products obtained, on raising the temperature progressively, become entirely soluble in organic esters, such as ethyl acetate, and yield products of condensation analogous to but not identical with those described in the previous specification.

2. By adding either a mixture of one or several natural resins and glycerine to heated mass of glyceryl phthalate.

3. By adding a mixture of phthalic anhydride and glycerine or phthalic anhydride only to a resinic ester already formed or in the course of formation.

In application No. 329,939, the difference was indicated between the construction of the base of the well-known glyptal resins and that of the new products.

The base of the new products was formed from the three elements glycerine, phthalic acid and natural resin, all combined to produce an "open-chain" compound. To form the new resinous products this base was polymerized, the result being a "closed-ring" or cyclic compound.

Now, in the present case, two groups of elements are employed, (1) glycerine and phthalic acid, (2) natural resin and glycerine, and either group may be formed into a "ring" compound (i. e. polymerized) before combination with the other group. The number of different combinations of (1) with (2) is 4, but this includes the combinations forming the subject of application No. 329,939, so for the present invention the number is 3. These combinations are indicated in the specification.

There is obtained a new molecular arrangement which differs from any preceding, and in which the central grouping is characterized by the grouping of the resinic ester represented by

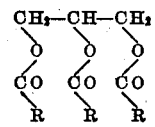

where R—COOH represents the resinic acid, which is clearly distinct from the bases as described in application No. 329,939.

The following are a few examples of manufacture of these new derivatives:

Example I

A finely pulverized mixture of one-half glyceryl phthalate resin (Ubbelohde dropping point 142–151°) and one-half resinic ester prepared from colophony is fused at 110–120°.

The temperature is progressively raised. From 200° upwards, an abundant gaseous emission is observed. The temperature is raised up to 290° in 8 hours, and the mass is poured when the temperature indicated has been reached. The product obtained is entirely soluble in the organic esters as well as in their mixtures with alcohol and hydrocarbons.

The product obtained has an Ubbelohde dropping point of 125–130°.

The proportion of glyceryl phthalate and resin used may be widely varied.

Example II

To 200 grams of glycerine heated to 110° are added in small portions 285 grams of phthalic anhydride and the temperature is raised to 170–180° in 6 hours; 200 grams of finely ground colophony and 40 grams of glycerine are added. This temperature is maintained until complete fusion takes place and the temperature is raised to 260° in 4 hours. As soon as this temperature has been reached the mass is poured off. The product obtained has an Ubbelohde dropping point of 110–115° and is entirely soluble in organic esters, as well as in their mixtures with alcohol and hydrocarbons.

Example III

To 200 grams of melted colophony are added, at 110–120°, 40 grams of glycerine, the temperature is raised to 270–280° in 2 hours and this temperature is maintained for 2 hours.

The temperature is allowed to decrease to about 200° and 200 grams of glycerine are added little by little, then the temperature is allowed to decrease to 110–120°, 285 grams of phthalic anhydride are added, the temperature is increased to 260° in 6 hours and then the mass is poured off.

The product obtained has an Ubbelohde dropping point of 100–106° and is entirely soluble in organic esters as well as in the mixtures with alcohol and by hydrocarbons.

Example IV

Into 200 grams of glycerine heated to 110° are introduced 285 grams of phthalic anhydride, and the temperature is increased to 170°–180° in 6 hours. At 180°, 200 grams of finely pulverized Manilla gum (acidity 57.5) and 20 grams of glycerine are slowly added. The temperature is maintained at 180° until a homogeneous mass is obtained and this is heated to 260° in 4 hours.

The mass obtained is poured off, the product obtained having an Ubbelohde dropping point of 112–120° and is soluble in organic esters as well as in their mixtures with alcohol and hydrocarbons.

Example V

Into 100 grams of melted colophony are introduced, at 250°, 100 grams of Congo gum, finely ground, and whilst maintaining the temperature at 250°, 40 grams of glycerine are introduced; this temperature is kept until a test yields a limpid globule. The resinic ester thus obtained is poured off and is finely ground.

On the other hand, into 200 grams of glycerine are introduced 285 grams of phthalic anhydride, at 110°, and the temperature is raised to 170–180° in 6 hours. The ester previously prepared with the colophony and the Congo gum is then slowly added and the temperature is maintained until complete fusion takes place. The temperature is then raised to 260° in 4 hours and cooling is undertaken. The product obtained has an Ubbelohde dropping point of 111–119° and is soluble in organic esters as well as in their mixtures with alcohol and hydrocarbons.

The Ubbelohde dropping point as used in the above examples is the range of temperature between which a meniscus appears when a lump of resin is heated in a narrow vessel, and a drop is formed which falls from a perforation in the bottom of the vessel. The apparatus of Ubbelohde is explained and described in the work of Hans Wolff (Berlin), translated into French as "Manuel de Laboratoire Pour L'Industrie des Vernis et Couleurs," by Jowe, published in Paris by Charles Beranger in 1926. Reference is to pages 7 and 8.

The above examples are not limited as concerns the proportions, processes, period and temperature of heating and nature of the resin or natural resins or gums employed. It is in fact possible to substitute for the one or the other, colophony, Congo gum, Manilla gum, dammar gum etc. The dropping points are likewise variable, within quite wide limits, with the proportions of the constituents, the period of heating and the temperature reached, that is to say, with the degree of polymerization.

These new resins, with regard to solvents, are easily dissolved in esters, such as ethyl acetate, butyl acetate, amyl acetate, benzyl acetate, ethyl phthalate, butyl phthalate, amyl phthalate, etc. In mixed solvents the new products also have a very high solubility, clearly better than that of most of the known synthetic resins, which gives them a new technical quality and a special aptitude for entering into the preparation of industrial products, for example, for the preparation of varnishes, lacquer paints, nitro-cellulose and aceto-cellulose varnishes, either alone or in combination with natural gums, nitrocellulose, aceto-cellulose, mineral or organic pigments or any other ingredients.

In the same way, they can be adapted to the manufacture of moulded objects either alone, or mixed with aceto-cellulose, nitrocellulose, synthetic resins and usual fillings.

Finally, by heating these new resinous products in the autoclave with linseed oil, as described in specification Serial No. 329,940 more or less viscous masses are obtained which are soluble in the products of distillation of coal, of tar and of petroleum and in mixtures of these products, for example: benzol, toluol, xylene, naphtha, petroleum, coal-tar oil, etc.

I claim:

1. A new resinous condensation product, formed by the combination of a polyhydric alcohol with a polybasic acid in proportions such as to combine substantially all of the hydroxyl groups of the alcohol, and a natural resin and a polyhydric alcohol in proportions such as to form a resinic ester, said ingredients being condensed together to form a product which is entirely soluble in organic esters, the product having fusibility indicated by an Ubbelohde dropping point between approximately 100° and 135° C.

2. A new resinous condensation product, comprising a combination of an ester formed by condensation of a polybasic acidic compound and a polyhydric alcohol in proportions such as to combine substantially all the hydroxyl groups of the alcohol with a resinic ester formed by combining a natural resin with a polyhydric alcohol.

3. Product as defined in claim 2, wherein the polybasic acidic substance employed is phthalic anhydride.

4. Product as defined in claim 2, wherein the polyhydric alcohol employed to form each ester is glycerine.

5. A new resinous condensation product, comprising a combination of an ester formed by condensation of a polybasic acidic compound and a polyhydric alcohol in proportions such as to combine substantially all the hydroxyl groups of the alcohol with a resinic ester formed by combining a natural resin with a polyhydric alcohol, and compounded with a siccative oil.

In testimony whereof I have hereunto affixed my signature.

ANDRÉ HENRI VICTOR DURR.